US008488265B2

(12) United States Patent
Martin

(10) Patent No.: US 8,488,265 B2
(45) Date of Patent: Jul. 16, 2013

(54) TAPE STORAGE PROCESSING

(75) Inventor: Christopher Martin, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 266 days.

(21) Appl. No.: 13/115,205

(22) Filed: May 25, 2011

(65) Prior Publication Data

US 2012/0300330 A1   Nov. 29, 2012

(51) Int. Cl.
*G11B 5/02* (2006.01)
(52) U.S. Cl.
USPC .......................................... 360/55; 369/53.39
(58) Field of Classification Search
None
See application file for complete search history.

(56) References Cited

U.S. PATENT DOCUMENTS

| 5,757,572 | A * | 5/1998 | Sasaki ........................ 360/72.2 |
| 6,549,489 | B1 * | 4/2003 | Van Der Enden et al. . 369/30.11 |
| 7,096,378 | B2 | 8/2006 | Stence et al. |
| 7,864,479 | B2 | 1/2011 | Ashton et al. |
| 7,894,154 | B2 | 2/2011 | Fujihara et al. |
| 2011/0122522 | A1 * | 5/2011 | Itagaki et al. ................... 360/15 |

OTHER PUBLICATIONS

Olav Sandsta,et.al, "Analysis of Retrieval of Multimedia Data Stored on Magnetic Tape", Multi-Media Database Mgmt Systems, Aug. 5-7, 1998 Proceedings,Intl Workshop, pp. 10.
R. Midtstraum,et.al, "Random I/O Performance of a Tandberg MLRI Tape Drive" Dec. 1998, 12 pages.

* cited by examiner

*Primary Examiner* — Paul Huber
(74) *Attorney, Agent, or Firm* — Arthur Ortega

(57) ABSTRACT

Techniques for processing tape storage include determining a current position of a read device to read a data block from a tape storage medium having a plurality of duplicate data areas, receiving a request to read a data block from the tape storage medium, and reading the requested data block from a duplicate data area from among the plurality of duplicate data areas that is nearest the current position of the read device.

20 Claims, 5 Drawing Sheets

TAPE STORAGE PROCESSING

BACKGROUND

Tape storage is often used as a means of data backup. Data may be written to the tape from the beginning of the tape to the end in a sequential manner and later read in the same sequential fashion. The complexities of tape format layout may be concealed from a host computer when writing to or reading from the tape. The host may be presented with a logical view of the tape and may not be aware of the physical aspects of tape formatting. Tape storage may provide greater storage capacity than disk based storage, but tape storage may provide slower data access compared to disk based storage.

DETAILED DESCRIPTION

As explained above, tape storage may be useful for data backup. Data may be written to the tape from the beginning of the tape to the end in a sequential manner and later read in the same sequential fashion. The complexities of tape format layout may be concealed from a host when writing to or reading from the tape. The host may be presented with a logical view of the tape and may not be aware of the physical aspects of tape formatting. Tape storage may provide greater storage capacity than disk based storage, but tape storage may experience slower data access compared to disk based storage.

Tape may be used for archive retrieval. In such an application, the time to locate and read data in a non-linear (sequential) manner may be an important consideration. Tape storage may be used such that data is recorded for long-term storage and data retrieval may be sporadic and from non-predictable locations within the entire storage volume of the tape. This may result in an undesirable increase in the time to retrieve the requested data due to the time required to position to the correct location on the tape.

The techniques of the present application may help improve the performance of tape storage. For example, a technique is disclosed which may improve access times for non-sequential reads, by creating multiple copies of data along the length of the tape in a format-specific manner. Disclosed is a tape apparatus that can provide multiple copies of the host data at different positions along the tape, so that when reading, the tape apparatus can select the nearest copy of the data. The host may only be provided with a single copy view of the data and the tape apparatus may manage the copies of data to provide improved access times.

The techniques of the present application may provide some further benefits. For example, providing multiple copies of data may improve redundancy in case one copy (or more) is not recoverable for some reason. That is, data integrity may be improved because there are multiple copies on the tape at different physical locations; if one copy could not be recovered or read successfully, the same data could be read from a different location. In addition, data retrieval times can be reduced, in exchange for a longer period of time during data storage and a reduction in tape capacity. These techniques can improve data format and access for a particular tape format, without having the host involved in low-level physical details of the tape format.

Figure 1:
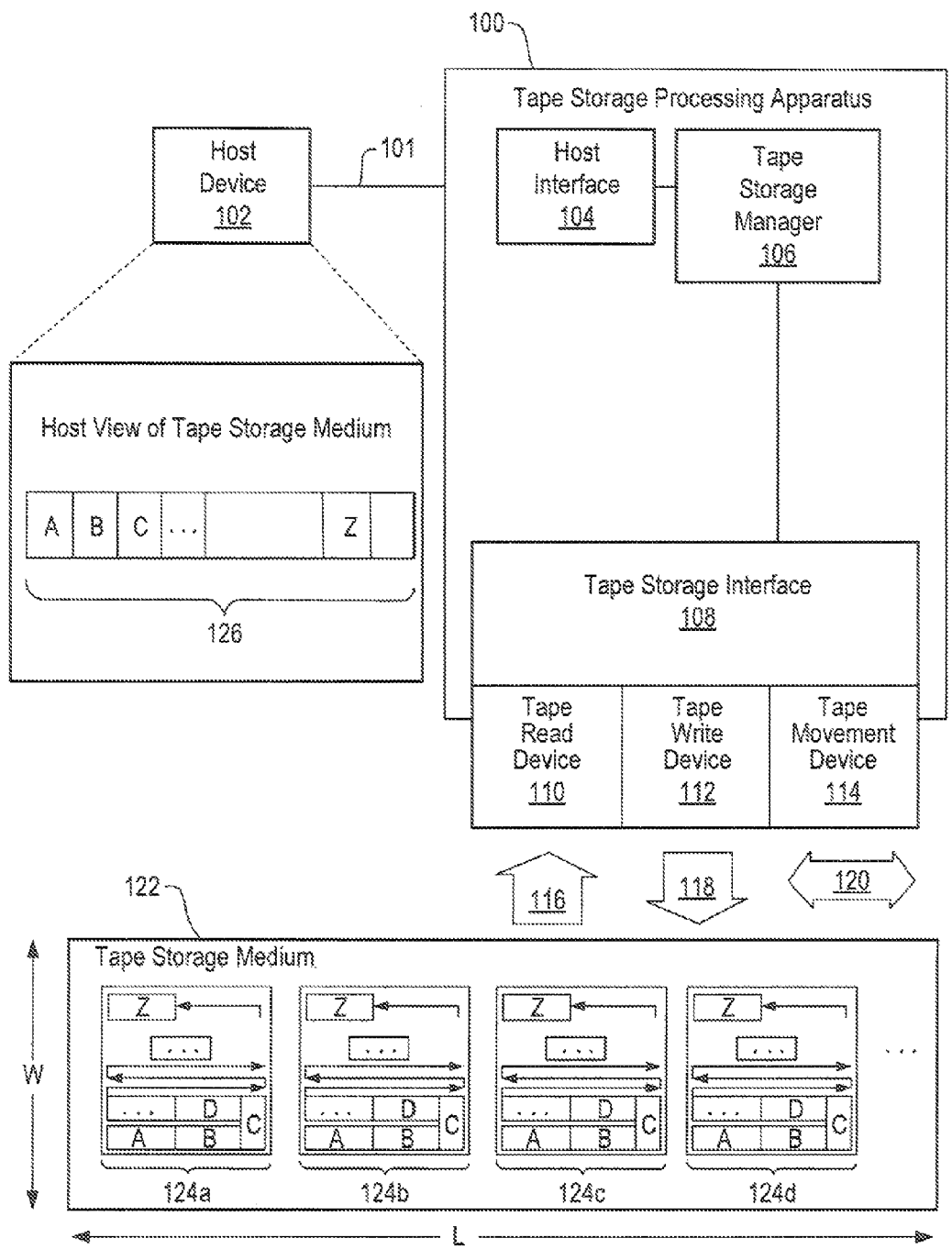
FIG. 1 is a block diagram of an example tape storage processing apparatus.

FIG. 1 is a block diagram of an example tape storage processing apparatus 100. The tape apparatus 100 includes a tape storage interface 108 which can provide an interface to tape storage medium 122. The tape storage interface 108 includes a tape read device 110 to read data 116 from tape medium 122, a write device 112 to write data 118 to the tape medium and a tape movement device 114 which can move in a longitudinal direction (shown as arrow 120) to move the tape medium along the length (L) of the tape medium. The tape medium 122 includes a plurality of duplicate data areas 124 shown, for example, as four duplicate data areas (124a, 124b, 124c and 124d). Each of the duplicate data areas (124a, 124b, 124c and 124d) can include data blocks such as, for example, data block (A) through data block (Z). The tape apparatus 100 includes a host interface 104 which can provide an interface to a host device 102 over a communication link 101. The tape apparatus 100 can include a tape storage medium manager 106 which can be configured to perform various functions including determining a current position of the read device 110 relative to the plurality of duplicate data areas 124.

In one example, to illustrate operation of tape apparatus 100, host device 102 can send to tape apparatus 100 a request to read a particular data block from tape medium 122. The tape manager 106 can read the requested data block from one of the duplicate data areas from among the plurality of duplicate data areas (124a, 124b, 124c, 124d) that is nearest the current position of tape read device 110. Once tape apparatus 100 has retrieved the requested data block, it can forward it to host device 102 over communication link 101. In this manner, tape apparatus 100 can read the data block that is nearest which may help improve data retrieval time.

The tape storage medium 122 is shown formatted in a serpentine manner with four duplicate data areas (124a, 124b, 124c, 124d). In this context, the term "serpentine" may be interpreted as meaning that data is read/written to one track(s) in a forward direction and then read/written on another track (s) in a reverse direction and so on. However, in other examples, it should be understood that tape storage 122 may be formatted with a different number of duplicate data areas. The duplicate data areas (124a, 124b, 124c, 124d) may be arranged in a sequential manner. In this context, the term "sequential" may be interpreted as meaning that one or more of the data areas are adjacent or next to each other though it should be understood that other configurations are possible. In this context, the term "duplicate" may be interpreted as meaning that one or more of the data areas comprise the same data. For example, each of the four data areas (124a, 124b, 124c, 124d) comprise the same data blocks (data block A through data block Z).

Although tape storage medium 122 is shown formatted in a serpentine manner, it should be understood that tape storage may be formatted in accordance with other formats. For example, the techniques of the present application can be equally applied to other non-serpentine recording formats such as a helical scan recording format. In this case, host device 102 may view tape medium 122 as having a linear arrangement or flow of data blocks (data block A through data block Z) in the first duplicate data area 124a, and the tape contents (data block A through data block Z) would be linear repeats on subsequent data areas 124b through 124d. The format may require an indication of distance along the length of the tape, and a means of determining the nearest duplicate data area.

The tape apparatus 100 may modify its view of tape medium 122. For example, tape medium 122 may have a total storage capacity (C). The tape apparatus 100 may modify its view of the tape medium by dividing the total capacity (C) into number (N) equal subdivisions. As a result, host 100 may be provided with a view of tape with a smaller effective capacity defined by C/N. For instance, tape apparatus can receive a command from host device 102 to divide the total capacity (C) of tape medium 122 into number (N) equal subdivisions. As a result, host 100 may be provided with a view 126 of tape medium 122 with a smaller effective capacity defined by C/N.

In another example, to illustrate, host 102 may request to format tape storage medium 122 as a multiple copy volume (MCV) with four duplicate data areas. As shown in FIG. 1, tape medium 122 may be formatted to have four duplicate data areas (124a, 124b, 124c, 124d). In this case, host device 102 is provided with view 126 of a single data area even though tape medium 122 has four duplicate data areas (124a, 124b, 124c, 124d). That is, the host may only be aware of single data area such as 124a which has a smaller effective storage capacity than the total original capacity (C) comprising all four duplicate data areas (124a, 124b, 124c, 124d). In another example, host 102 may be configured to view all of the total original capacity (C) comprising four duplicate data areas (124a, 124b, 124c, 124d). It should be understood that tape medium 122 can be configured to have a different number of duplicate data areas.

The tape apparatus 100 may comprise a tape drive which may be a data storage device that can read and write data on a magnetic tape such as tape storage medium 122. The tape storage medium 122 can comprise a magnetic tape medium capable for storing data and capable of having data retrieved therefrom. The tape storage medium 122 is shown as having a length L and a width W. The tape storage medium 122 may include one or more data tracks along the length of the medium for storing data. The tape storage medium 122 may also include one or more servo tracks containing positional information relating to the data tracks and the like. The tape storage medium 122 may be packaged in cartridges and cassettes. The tape medium 122 can be formatted in accordance with various formats. For example, tape storage 122 may be formatted in accordance with the linear tape-open (LTO) standard which is an open standard for magnetic tape data storage technology. The tape medium 122 may be detachable from tape apparatus 100 which may allow the tape medium to be unloaded for archival purpose and later reloaded to retrieve data therefrom.

The tape storage interface 108 can be configured to control the operation of tape read device 110, tape write device 112 and tape movement device 114. The tape read device 110 may include a tape head with a transducer to read data (shown as arrow 116) from tape medium 122. The storage interface 108 can include components such as a motor and control circuitry to move read device 110 across the width (W) of tape medium to be able to read data (shown as arrow 116) from tape medium. The storage interface 108 can include components such as a motor and control circuitry to move tape write device 112 across the width (W) of tape medium to be able to write data (shown as arrow 118) to tape medium. The tape write device 112 can include a tape head with a transducer to write data (shown as arrow 118) to tape medium 122. The storage interface 108 can include components such as a motor and control circuitry to allow tape movement device 114 to move tape medium 122 in a longitudinal direction (shown as arrow 120) along the length (L) of the tape medium. The storage interface 108 can determine the current position of tape read device 110 relative to a particular location on tape medium 122. For example, the storage interface 108 can determine the current position of tape read device 110 relative to one of the duplicate data areas from among the four duplicate data areas (124a, 124b, 124c, 124d). The storage interface 108 can communicate this information to tape storage manager 106 for subsequent processing.

The host device 102 is shown as being capable of communicating with tape storage apparatus 100 over communication link 101. The host device 102 can be any data processing device such as a tablet computer, server computer, client computer, notebook computer, mainframe, smart-phone or any other electronic device capable of processing data. The communication link 101 can be any means of facilitating communication among a plurality of electronic devices. For example, it can include a storage area network (SAN), network access storage (NAS), Ethernet, Fibre Channel, small computer system interface (SCSI), Serial Attached SCSI (SAS), peripheral component interconnect express (PCIe), wired and wireless communication means, the Internet, a communications network or any other means of electronic communication.

The components of tape apparatus 100 may be implemented in hardware, software or a combination thereof. For example, the functionality of tape storage manager 106 may be implemented as memory with instructions executable by a processor to perform the functions described herein. In another example, the functionality of tape storage manager 106 may be implemented in hardware such as in an application specific integrated circuit (ASIC) or other similar technology.

Figure 2:
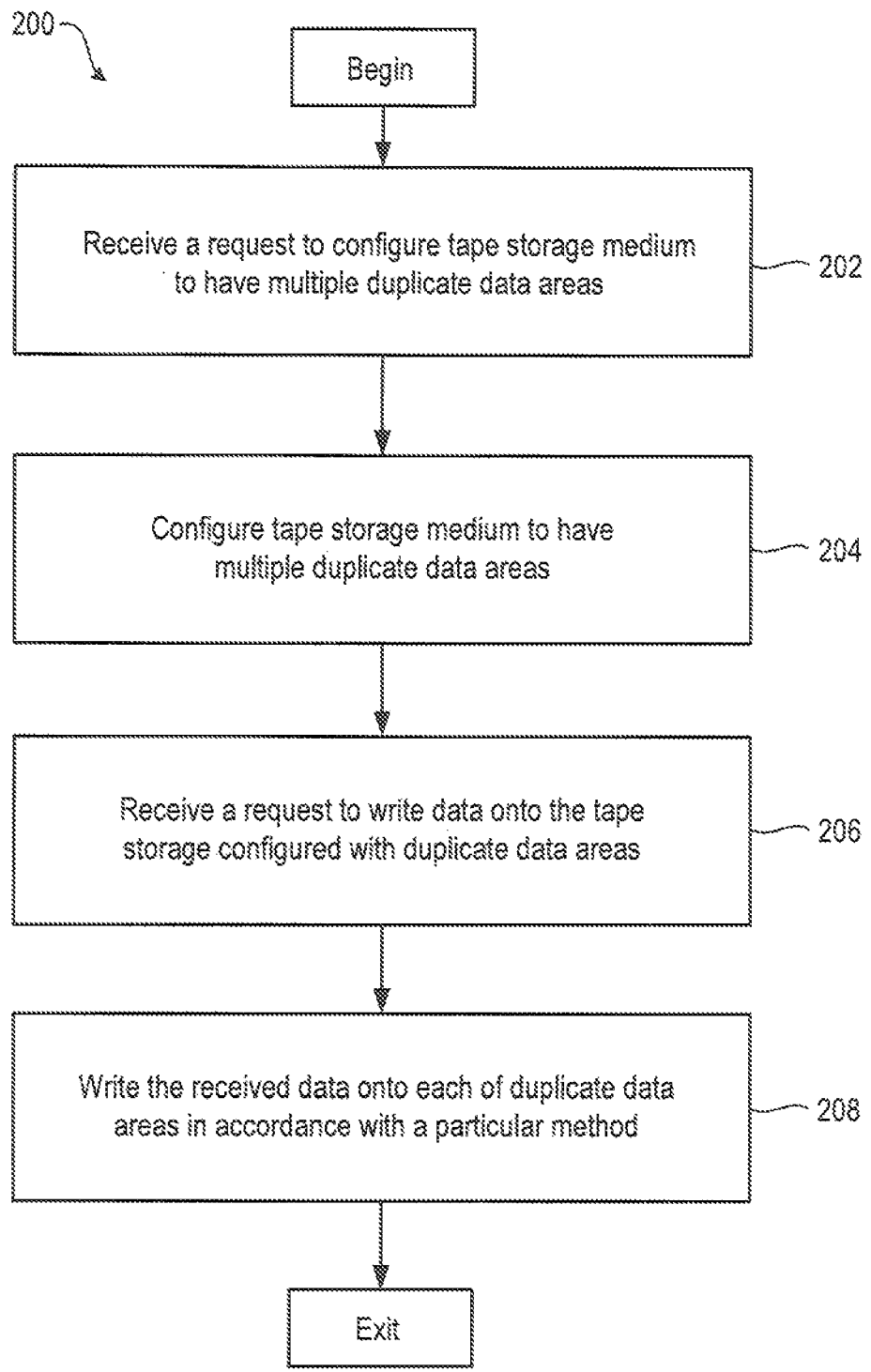
FIG. 2 is a flow diagram of an example method of configuring a tape storage medium.

FIG. 2 is a flow diagram 200 of an example method of configuring a tape storage medium.

At block 202, tape apparatus 100 receives a request to configure tape storage medium to have multiple duplicate data areas. Configuration of tape medium 122 may be interpreted as meaning to format the layout of the tape medium in a prescribed manner. For example, host device 102 may send a configuration request over communication link 101. The request may be received by host interface 104 and forwarded to tape storage manager 106 for further processing. The request may include instructions for tape apparatus 100 to format tape storage medium as a multiple copy volume (MCV) with a number (N) of duplicate data areas. To illustrate, in one example, the number (N) of duplicate data areas 124 can be specified to be four duplicate data areas (124a, 124b, 124c, 124d) as shown in FIG. 1. However, it should be understood that tape medium 122 can be configured to be formatted with a different number of duplicate data areas.

At block 204, tape apparatus 100 configures tape storage medium to have multiple duplicate data areas. It may be assumed that tape medium 122 has a total storage capacity (C). The tape apparatus 100 may modify its view of the tape medium by dividing the total capacity (C) into number (N) equal subdivisions. As a result, host 100 may be provided with a view of tape 126 with a smaller effective capacity defined by C/N. For instance, to illustrate, host 102 may request to format tape storage medium 122 as a multiple copy volume (MCV) with four duplicate data areas. As shown in FIG. 1, tape medium 122 may be formatted to have four duplicate data areas (124a, 124b, 124c, 124d). It should be understood that tape medium 122 can be configured to have a different number of duplicate data areas. In this case, in one example, host may only be aware of single data area which has a smaller effective storage capacity than the total original capacity (C) comprising all four duplicate data areas (124a, 124b, 124c, 124d).

At block 206, tape apparatus 100 receives a request to write data onto the tape storage configured with duplicate data areas. As described below in further detail, in one example, the present application provides four methods of writing data blocks to duplicate data areas. The particular method of writing data may correspond to particular method of sending data to tape apparatus.

At block 208, tape apparatus 100 writes the received data onto each of duplicate data areas in accordance with a particular method of writing data blocks to duplicate data areas. As described below in further detail, in one example, the present application provides four methods of writing data blocks to duplicate data areas. However, it should be understood that there may be other methods of writing data blocks to duplicate data areas. For example, there can be another method that is a combination of any of the described four methods of writing of data to duplicate data areas. In one example, as explained above, tape medium 122 may be detachable and thus can be unloaded from tape apparatus 100. Therefore, in this example, once the process of writing data to tape medium 122 is complete, the tape medium can be unloaded/unmounted from the tape apparatus for archival purposes. The tape medium 122 can later be loaded/mounted to tape apparatus 100 when it is desired to retrieve data from the tape medium.

Figure 3A:
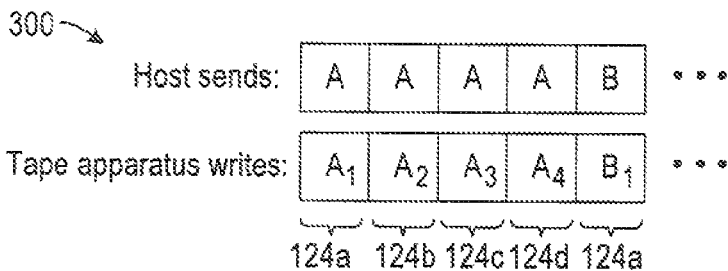
FIG. 3A is a diagram of a first method of writing data blocks to a tape storage medium.

FIG. 3A is a diagram of a first method 300 of writing data blocks to tape storage medium 122. For example, in this method, host device 102 can instruct tape apparatus 100 to configure tape medium 122 as a multiple copy volume (MCV) with a number (N) of duplicate data areas. To illustrate, it will be assumed that tape medium 122 has been configured to have four duplicate data areas (124a, 124b, 124c, 124d). To simplify the description of this method, shown are only the first data blocks (A1, A2 A3, A4) of the four duplicate data areas and the second data block (B1) of the first duplicate data area. The host device 102 may be be aware of the multiple copies of tape medium 122 and can instruct tape apparatus 100 to write to the different duplicate data areas. The host device 102 can send to tape apparatus 100 a first data block (A) which the apparatus can then write as first data block (A1) to first duplicate data area 124a. The host device 102 can then send to tape apparatus 100 first data block (A) again.

In response, apparatus 100 can then write the first data block (A) again, but this time it can write first data block (A) as first data block (A2) to the second data area 124b. The tape apparatus 100 can continue this process until all four duplicate data areas have been written. Once tape apparatus 100 has completed writing the first data block (A) to the four duplicate data areas, host 102 can then proceed to move on to data block B and repeat the process.

Figure 3B:
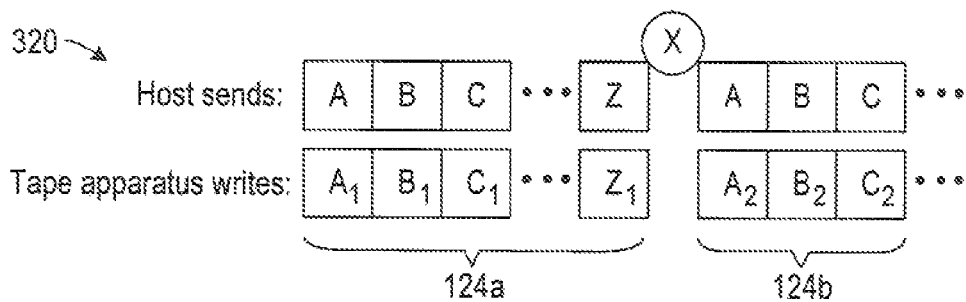
FIG. 3B is a diagram of a second method of writing data blocks to a tape storage medium.

FIG. 3B is a diagram of a second method 320 of writing data blocks to a tape storage medium. For example, in this method, host device 102 can view tape medium 122 as having a plurality of virtual tapes. For example, tape medium 122 can be formatted to have four data areas (124a, 124b, 124c, 124d) but only the first and second data areas are shown to simplify the description. The host 102 may view these four duplicate data areas as four separate virtual tapes. In this case, host 102 can load/mount a first virtual tape corresponding to first duplicate data area 124a and then perform a copy all of the data blocks (including data block A through data block Z) at once. The host 102 can then load/mount the second virtual tape (at the point labeled X) and repeat the process for the remaining virtual tapes.

Figure 3C:
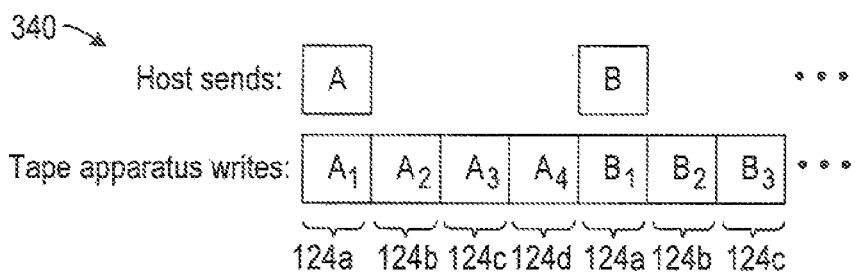
FIG. 3C is a diagram of a third method of writing data blocks to a tape storage medium.

FIG. 3C is a diagram of a third method 340 of writing data blocks to a tape storage medium. For example, in this method, host device 102 may only send each data block once, such as starting with data block (A) as shown in FIG. 3C. The tape apparatus 100 may be responsible for writing to as many duplicate areas as been configured, and can write the first data block (A) before reporting completion to host 102. For example, to illustrate, tape medium 122 can be configured to have four duplicate data areas (124a, 124b, 124c, 124d). Once tape apparatus 100 has completed writing first data block (A) to the four duplicate data areas (124a, 124b, 124c, 124d), it can then report completion to host 102. In response, host 102 can then send the second data block (B), and have tape apparatus 100 then copy second data block (B) to all four duplicate data areas (124a, 124b, 124c, 124d). The process may be repeated for any remaining data blocks.

Figure 3D:
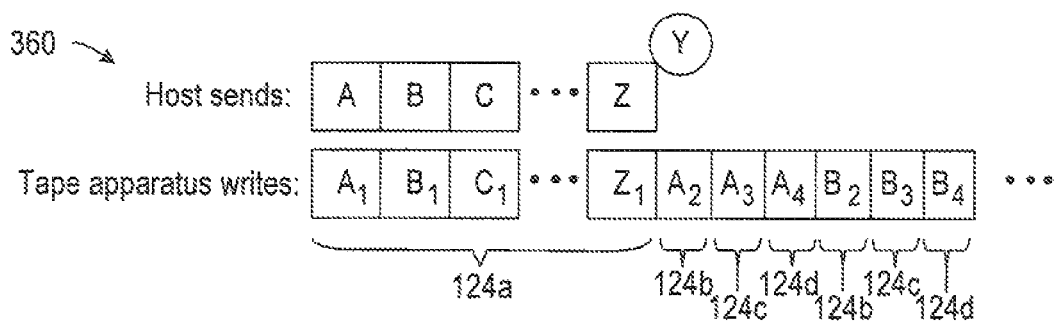
FIG. 3D is a diagram of a fourth method of writing data blocks to a tape storage medium.

FIG. 3D is a diagram of a fourth method 360 of writing data blocks to a tape storage medium. For example, to illustrate, it will be assumed that tape medium 122 has been configured to have four duplicate data areas (124a, 124b, 124c, 124d). In this method, for example, host device 102 can send each data block once, and have tape apparatus 100 write each data block to the first duplicate data area 124a. On completion (at the point labeled Y), host device 102 may instruct tape apparatus 100 to begin the duplication process, and then can reduce its role in the process.

The tape apparatus 100 may be responsible for making copies of all the first data blocks (A), then all the second data blocks (B), and so on. To do this, tape apparatus 100 may first read the original data block (A1) from the first duplicate data block 124a and then write it out as data block (A2) to the second duplicate data area 124b and so on. In one example, tape apparatus 100 may include an internal cache memory (not shown) and read as many data blocks as may fit into the internal cache memory. The tape apparatus 100 may then proceed to write the data blocks all in sequence. For example, to illustrate, tape apparatus 100 may read data block A1 through data block F1 (from first data duplication area 124a) and then write data block A2 through data block F2 (to second data duplication area 124b), data block A3 through data block F3 (to third data duplication area 124c) and data block A4 through data block F4 (to fourth data duplication area 124d). This technique may help reduce the number of times that tape read device repositions necessary to complete the copy operation.

Figure 4:
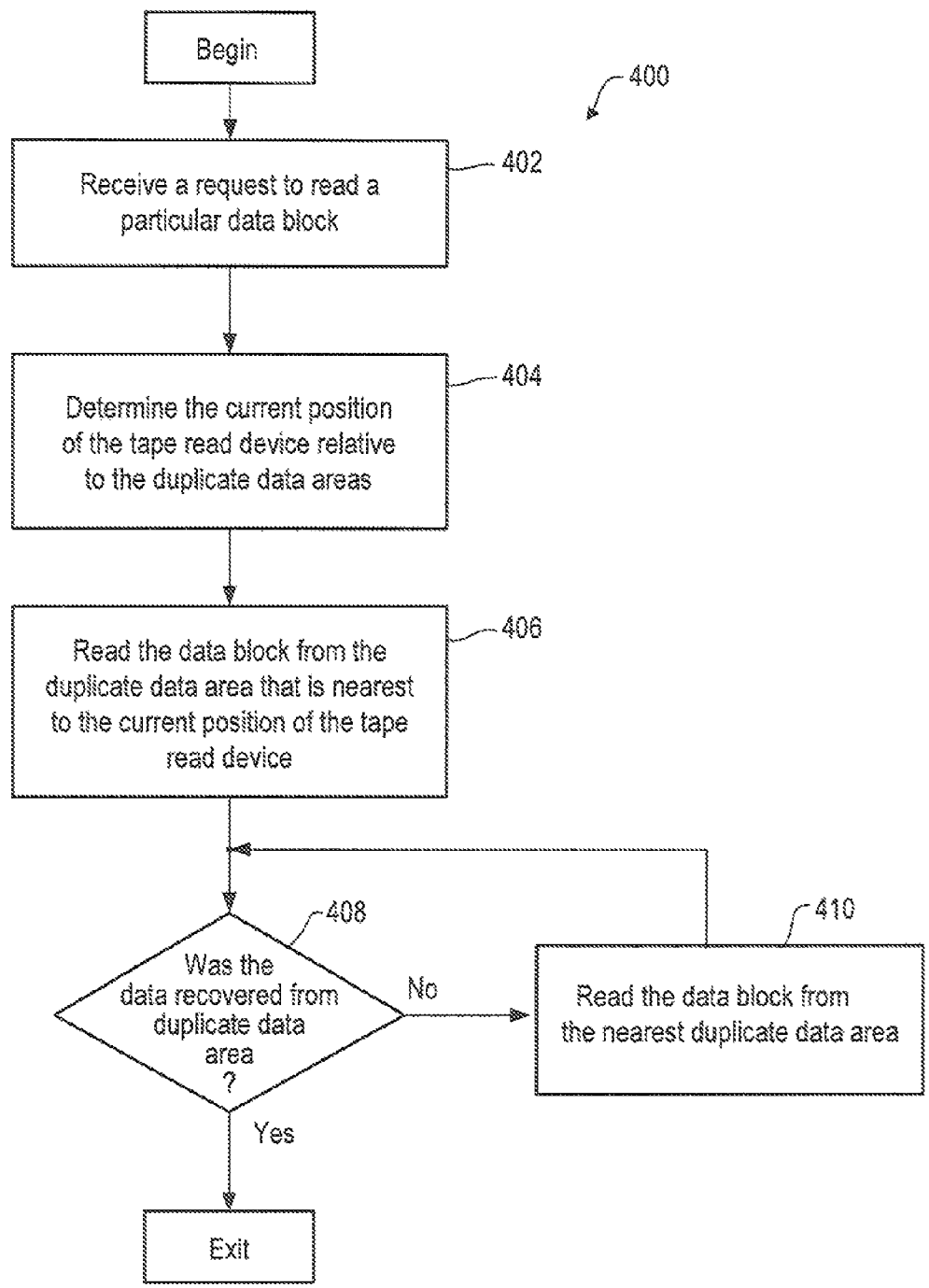
FIG. 4 is a flow diagram of an example method of reading data blocks from a tape storage medium.

FIG. 4 is a flow diagram 400 of an example method of reading data blocks from a tape storage medium 122. To illustrate, it will be assumed that tape medium 122 is configured to have four duplicate data areas (124a, 124b, 124c, 124d) as shown in FIG. 1. However, it should be understood that these techniques can be applied to a different number of duplicate data areas.

At block 402, tape apparatus 100 receives a request to read a particular data block. For example, host 102 can send tape apparatus 100 a request to read a particular data block such as data block (C). As explained above, in one example, host 102 may not be aware that tape medium 122 has been configured to have four duplicate data areas. In another example, host 102 may be aware of the configuration of tape medium 122 and request a data block from a particular duplicate data area from among the four duplicate data areas (124a, 124b, 124c, 124d).

At block 404, tape apparatus 100 determines the current position of the tape read device 110 relative to duplicate data areas (124a, 124b, 124c, 124d). For example, to illustrate, it may be assumed that the current position of tape read device 110 is at data block (B) of the first duplicate data area 124a. In one example, tape storage interface 108 can determine the current position of tape read device 110 and communicate this information to tape storage manager 106 for subsequent processing.

At block 406, tape apparatus 100 reads the data block from the duplicate data area that is nearest to the current position of tape read device 110. As explained above, to illustrate, it may be assumed that tape apparatus 100 determined that the current position of tape read device 110 is at data block (B) at the first duplicate data area 124a. It can be further assumed that the read request specifies data block (C). In this case, tape apparatus 100 may determine that the first duplicate data area 124a is nearest to the current position of tape read device 110. The tape storage manager 106 can proceed to read data block (C) from first duplicate data area 124a. For instance, tape storage manager 106 can instruct tape storage interface 108 to have read device 110 move along the width (W) of tape medium 122 and to have tape movement device 114 move the tape medium in a particular direction (arrow 120) along the length (L) of tape medium and away from the current position at data block (B) and towards data block (C) of the first duplicate data area 124a. The tape read device 110 is now in a position to read data block (C) from first duplicate data area 124a. It may be appreciated that determination of which duplicate data area to use may include consideration of many factors including but not limited to the linear position along the tape length, the vertical position across the tape width, and the current direction of tape motion (if any). The term "nearest" may mean the copy of the data block which can be accessed in the fastest time.

To further illustrate the operation of this technique, it can be further assumed that host 102 sends a subsequent request to read data block (A). In this case, tape apparatus 100 may determine that the current position of tape read device 110 is at data block (C) of first duplicate data area 124a as a result of the last read operation. The tape storage manager 106 may determine that the nearest duplicate data area is second duplicate data area 124b. That is, data block (A) of the second duplicate data area 124b is nearer to read compared to data block (A) of the first data area 124a. In this example, tape manager 106 can proceed to read data block (A) from second duplicate data area 124b. Again, tape storage manager 106 can instruct tape storage interface 108 to move read device 110 and tape medium 122 in a manner as to allow data block (A) to be read from second duplicate data area 124b.

At block 408, tape apparatus 100 checks whether the data was recovered from the particular duplicate data area. Continuing with the above example, tape apparatus 100 may check whether it was able to read first data block (A) from duplicate data area 124a. This may entail performing various verification algorithms on the read data such as a check sum operation. If the data was recovered successfully, then the read processing is complete at this time and exits. On the other hand, if the data was not recovered successfully, then processing proceeds to block 410. For example, the data may not have been capable of being recovered because of some corruption to the data area or some other condition.

At block 410, tape apparatus 100 reads the data block from the next nearest duplicate data area. For example, if tape apparatus 100 was not successful in reading first data block (A) from first duplicate data area 124a, then tape apparatus 100 may proceed to read first data block (A) from second duplicate data area 124b. This sequence may be repeated until the data block has been successfully read from one of the duplicate data areas. Therefore, providing multiple copies of data may improve redundancy in case one copy is not recoverable for some reason. This may improve data integrity because if one copy of the data was not able to be recovered or read successfully from a particular duplicate data area, the same data could be read from a different duplicate data area. Processing proceeds back to block 408 where tape apparatus again checks whether the retrieved data block was recovered successfully.

Figure 5:
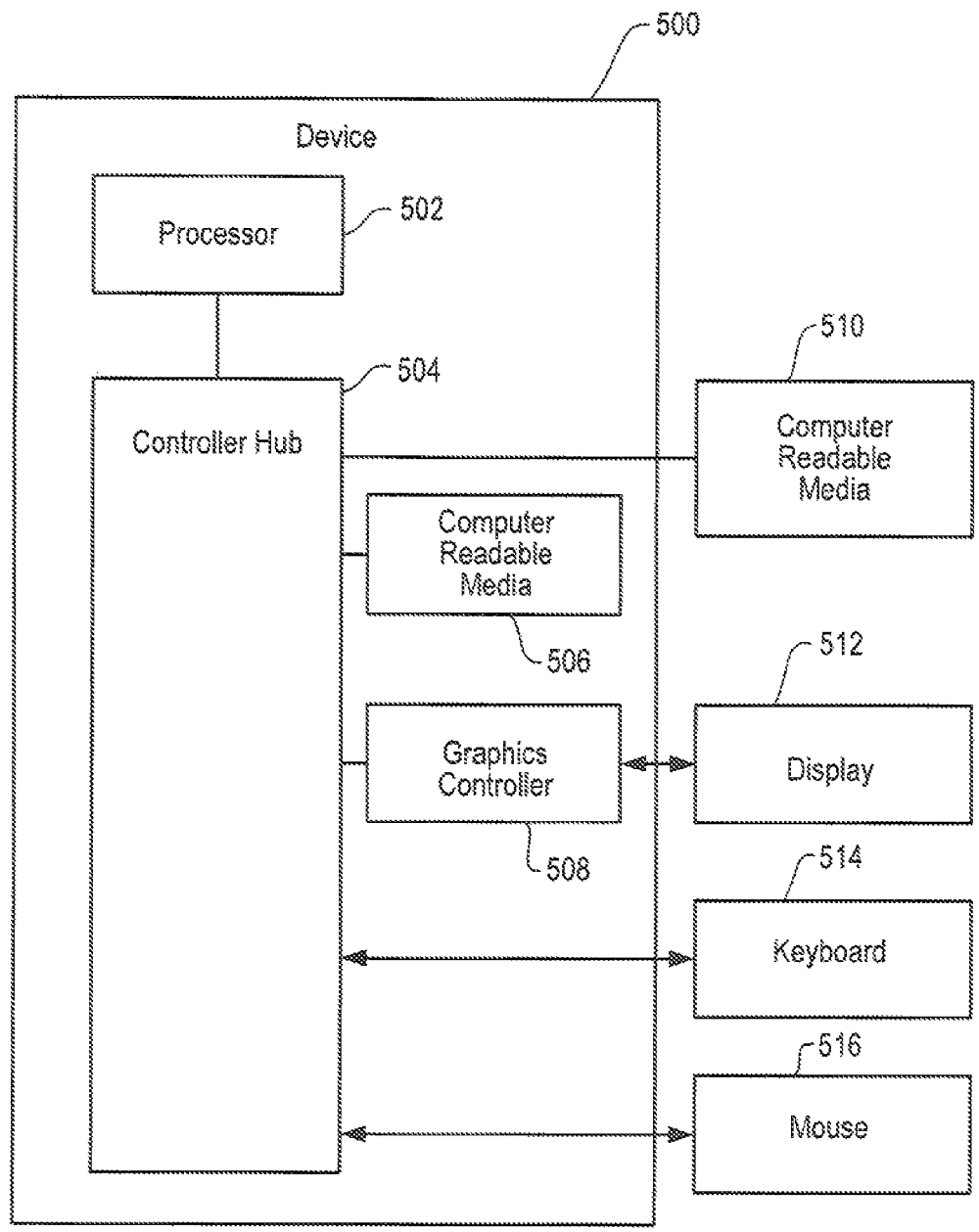
FIG. 5 is a block diagram of an example device which can be used to implement the techniques of the present application.

FIG. 5 is a block diagram of an example device 500 which can be used to implement the techniques of the present application. The device 500 can include hardware such as a processor 502. The processor 502 can be connected to a controller hub 504. The controller hub 504 and processor 502 may be integrated as one component. The controller hub 504 can be connected to other controllers, peripherals or components. For example, a graphics controller 508 can be connected to controller hub 504. The graphics controller 508 can provide data to display 512 to be displayed.

The controller hub 504 may be connected to other peripherals such as a keyboard 514 or mouse 516. The keyboard 514 or mouse 516 may be connected to an input output controller or a keyboard controller that is part of the controller hub 504.

The controller hub 504 may be connected to computer readable media 506 or 510. The computer readable media 506 or 510 can include code that if executed can cause processor 502 to determine a current position of a read device to read a data block from a tape storage medium having a plurality of duplicate data areas, receive a request to read a data block from the tape storage medium, and read the requested data block from a duplicate data area from among the plurality of duplicate data areas that is nearest the current position of the read device The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present example invention. However, it will be understood by those skilled in the art that the present example invention may be practiced without these details. While the example invention has been disclosed with respect to a limited number of embodiments, those skilled in the art will appreciate numerous modifications and variations there from. It is intended that the appended claims cover such modifications and variations as fall within the true spirit and scope of the example invention.

The invention claimed is:

1. A tape storage processing apparatus comprising:
   a tape storage interface having a tape read device to read data blocks from a plurality of duplicate data areas on a tape storage medium;
   a host interface to receive a request to read a data block from the tape storage medium; and
   a tape storage manager to determine a current position of the read device relative to the plurality of duplicate data areas and to read the requested data block from a duplicate data area from among the plurality of duplicate data areas that is nearest the current position of the read device.

2. The tape storage processing apparatus of claim 1, wherein the tape storage medium is detachable from the tape storage processing apparatus.

3. The tape storage, processing apparatus of claim 1, wherein the host interface is configured to receive a request to write a data block to the tape storage medium and the tape storage manager is configured to write the data block to each of the plurality of duplicate data areas.

4. The tape storage processing apparatus of claim 1, wherein the host interface is configured to receive a request to write a data block to a particular one of the plurality of duplicate data areas and the tape storage manager is configured to write the data block to the particular one of the plurality of duplicate data areas.

5. The tape storage processing apparatus of claim 1, wherein if the requested data block is not recoverable from the duplicate data area that is nearest the current position of the read device, then the storage manager is configured to read the requested data block from the next nearest duplicate data area.

6. The tape storage processing apparatus of claim 1, wherein the host interface is configured to present to a host a view of the tape storage medium by presenting a single duplicate data area view of the plurality of duplicate data areas.

7. The tape storage processing apparatus of claim 1, wherein the host interface is configured to present to a host a view of the tape storage medium by presenting a view of the plurality of duplicate data areas.

8. A method of processing tape storage, the method comprising:
   determining a current position of a read device to read a data block from a tape storage medium having a plurality of duplicate data areas;
   receiving a request to read a data block from the tape storage medium; and
   reading the requested data block from a duplicate data area from among the plurality of duplicate data areas that is nearest the current position of the read device.

9. The method of claim 8, further comprising receiving from a host a request to write a data block to the tape storage medium and writing the data block to each of the plurality of duplicate data areas.

10. The method of claim 8, further comprising receiving a request to write a data block to a particular one of the plurality of duplicate data areas and writing the data block to the particular one of the plurality of duplicate data areas.

11. The method of claim 8, wherein if the requested data block is not recoverable from the duplicate data area that is nearest the current position of the read device, further comprising reading the requested data block from the next nearest duplicate data area.

12. The method of claim 8, further comprising presenting to a host a view of the tape storage medium by presenting a single duplicate data area view of the plurality of duplicate data areas.

13. The method of claim 8, further comprising presenting to a host a view of the tape storage medium by presenting a view of the plurality of duplicate data areas.

14. A computer readable medium comprising code that if executed causes a processor to:
   determine a current position of a read device to read a data block from a tape storage medium having a plurality of duplicate data areas;
   receive a request to read a data block from the tape storage medium; and
   read the requested data block from a duplicate data area from among the plurality of duplicate data areas that is nearest the current position of the read device.

15. The computer readable medium of claim 14 further comprising code that if executed causes a processor to:
   receive from a host a request to write a data block to the tape storage medium and write the data block to the plurality of duplicate data areas.

16. The computer readable medium of claim 14 further comprising code that if executed causes a processor to:
   receive a request to write a data block to a particular one of the plurality of duplicate data areas and write the data block to the particular one of the plurality of duplicate data areas.

17. The computer readable medium of claim 14 further comprising code that if executed causes a processor to:
   if the requested data block is not recoverable from the duplicate data area that is nearest the current position of the read device, read the requested data block from the next nearest duplicate data area.

18. The computer readable medium of claim 14 further comprising code that if executed causes a processor to:
   present to a host a view of the tape storage medium by presenting a single duplicate data area view of the plurality of duplicate data areas.

19. The computer readable medium of claim 14 further comprising code that if executed causes a processor to:
   present to a host a view of the tape storage medium by presenting a view of the plurality of duplicate data areas.

20. The computer readable medium of claim 14 further comprising code that if executed causes a processor to:
   write a data block to the plurality of duplicate data areas in a serpentine manner.

* * * * *

UNITED STATES PATENT AND TRADEMARK OFFICE
CERTIFICATE OF CORRECTION

PATENT NO. : 8,488,265 B2  
APPLICATION NO. : 13/115205  
DATED : July 16, 2013  
INVENTOR(S) : Christopher Martin Page 1 of 1

It is certified that error appears in the above-identified patent and that said Letters Patent is hereby corrected as shown below:

In the Claims

In column 9, line 19, in Claim 3, delete "storage," and insert -- storage --, therefor.

Signed and Sealed this
Nineteenth Day of November, 2013

Teresa Stanek Rea
*Deputy Director of the United States Patent and Trademark Office*